United States Patent [19]
Griffin et al.

[11] 3,840,292
[45] Oct. 8, 1974

[54] ANTI-GLARE REAR VIEW MIRROR INCORPORATING A MELTABLE THERMOPLASTIC MATERIAL

[75] Inventors: Henry W. Griffin, Birmingham; Vaughn D. Everhart, Warren, both of Mich.

[73] Assignee: General Motors Corporation, Detroit, Mich.

[22] Filed: Sept. 4, 1973

[21] Appl. No.: 394,353

[52] U.S. Cl................ 350/278, 350/160 R, 350/279
[51] Int. Cl............................ B60r 1/04, G02b 7/18
[58] Field of Search............................ 350/278, 279

[56] References Cited
UNITED STATES PATENTS
3,280,701  10/1966  Donnelly et al. ............... 350/278 X
3,604,781  9/1971  Gaeth et al. ................. 350/278 UX

*Primary Examiner*—John K. Corbin
*Attorney, Agent, or Firm*—Peter D. Sachtjen

[57] ABSTRACT

An anti-glare rear view mirror includes a meltable medium contained between a front clear glass element and a rear reflectorized glass element. The medium has a high optical transmission when melted and a lower transmission when solidified. An operator controlled heating element melts the contained medium to provide maximum transmission and reflectivity for "day" driving mode. Deenergizing the heating element allows solidification of the medium to provide a lower transmission and reflectivity for a "night" driving mode.

3 Claims, 4 Drawing Figures

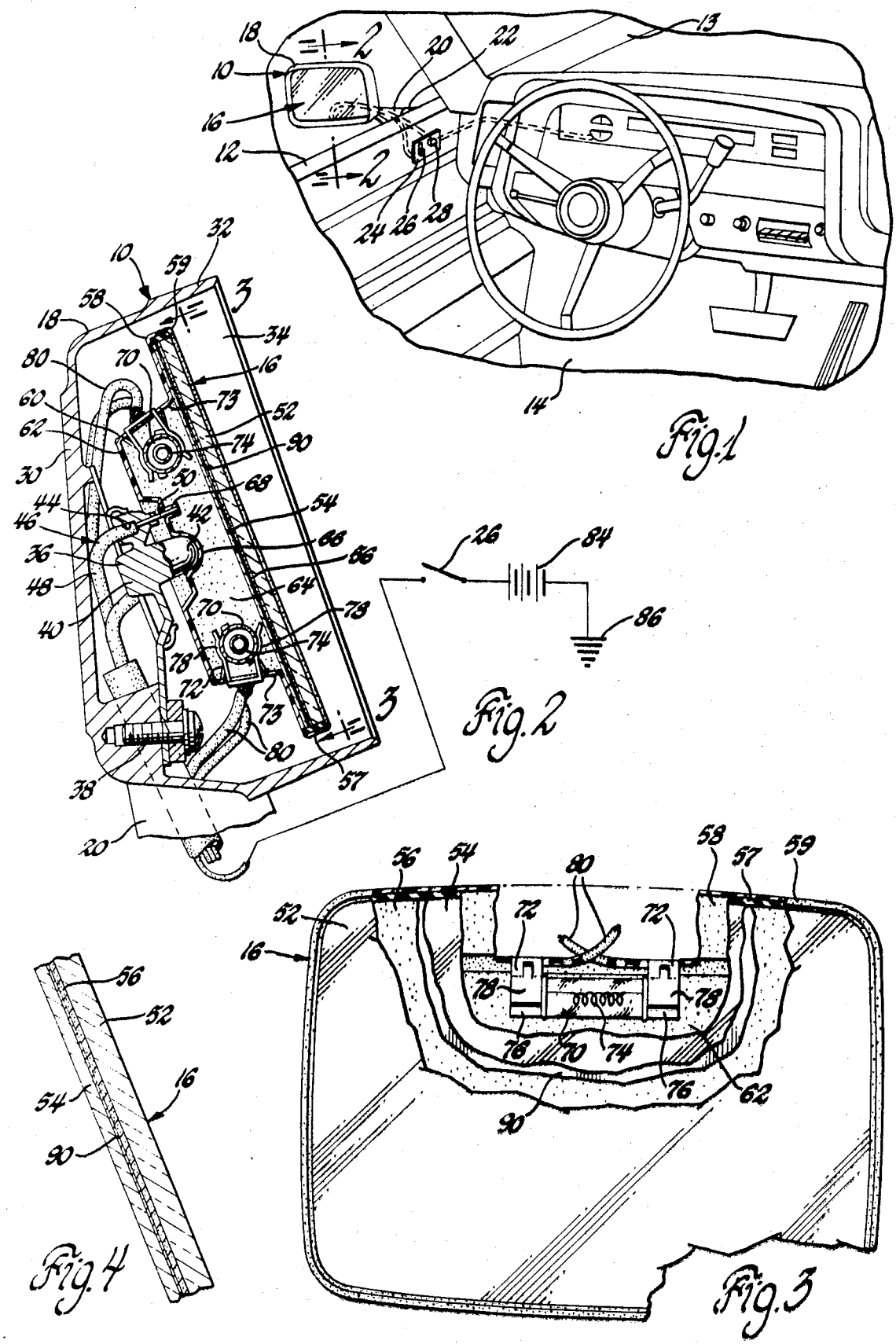

ANTI-GLARE REAR VIEW MIRROR INCORPORATING A MELTABLE THERMOPLASTIC MATERIAL

The present invention relates to rear view mirrors and, in particular, to an improved anti-glare rear view mirror for motor vehicles incorporating a meltable thermoplastic material embedded between a transparent and a reflective element that is selectively melted to produce a change in reflective characteristics of the mirror.

Anti-glare rear view mirrors for motor vehicles are generally operative to provide a high reflectivity "day" viewing surface and a low reflectivity "night" viewing surface. Most designs incorporate a prismoidal mirror element wherein a reflecterized rear surface is observable in the "day" viewing mode to provide the high efficiency viewing surface while the relatively inclined front surface is positioned with respect to the driver to provide the low efficiency anti-glare or "night" viewing mode. A manually operable trigger mechanism shifts the mirror element between the two positions.

A prismoidal type mirror, however, it not entirely suitable for all rear viewing applications. This type of mirror requires a viewing tunnel from which extraneous ambient light is eliminated. Otherwise, under conditions of high levels of ambient lighting, the high efficiency surface predominates and renders the anti-glare surface inoperative. Because an outside location may be intermittently exposed to high levels of ambient lighting during nighttime driving, this approach has not been considered satisfactory for such mirrors. Other approaches for anti-glare mirrors have included retaining a liquid crystal medium between two glass elements, the rear one of which is reflectorized. The liquid crystals upon application of an electric field are oriented normal to the viewing surface to provide minimum absorption of illumination. In the unenergized state, the crystals are randomly scattered to absorb a greater percentage of illumination thereby providing the desired low efficiency viewing conditions. However, liquid crystals create sealing problems and are satisfactorily operable only within a narrow temperature range not generally compatible with the required operating conditions for motor vehicle applications.

The present invention provides an anti-glare rear view mirror adaptable for interior and exterior use on motor vehicles which does not require a reorientation of the mirror element to provide the desired day/night viewing modes and which avoids the temperature and sealing problems associated with liquid crystal mirrors. The subject mirror incorporates a meltable thermoplastic medium between a front clear glass element and a rear reflectorized glass element. The glass elements are spaced to define a thin cavity in which the thermoplastic material is retained. The thermoplastic material has a high optical transmission to light when melted and a low transmission to light when solidified. The mirror includes heating elements for selectively melting the thermoplastic medium. The heating elements are operator controlled to melt or permit selective solidification of the medium. When the heating elements are energized, the thermoplastic medium is melted to provide maximum reflective characteristics in the "day" viewing mode. When the heating elements are deenergized, the thermoplastic medium solidifies to provide lower reflective characteristics desirable for the "night" viewing mode. The various viewing modes are thus obtainable without reorientation of the mirror position. Additionally, the use of a thermoplastic medium greatly reduces the sealing problems associated with the liquid crystal mirrors. By having direct application of heat establish one reflective condition while a slight absence of heat establishes the other reflective condition, the device operates substantially independent of the ambient temperature conditions.

These and other features of the present invention will be apparent to one skilled in the art upon reading the following detailed description, reference being made to the accompanying drawings illustrating a preferred embodiment in which:

FIG. 1 is a perspective view of a motor vehicle incorporating an anti-glare rear view mirror made in accordance with the present invention;

FIG. 2 is an enlarged cross sectional view of the rear view mirror including the electrical circuit for the heating elements;

FIG. 3 is a fragmentary view taken along line 3—3 of FIG. 2 showing the mirror elements, thermoplastic medium and heating elements; and FIG. 4 is an enlarged fragmentary view of the mirror element showing the disposition of the front and rear glass elements with the meltable thermoplastic medium in the cavity therebetween.

Referring to FIG. 1 there is shown an anti-glare rear view mirror 10 mounted on a side door 12 of a motor vehicle 13 exteriorally of the passenger compartment 14. The mirror 10 generally comprises a mirror unit 16 retained in a housing 18. The housing 18 is mounted at the upper end of a support arm 20 which projects outwardly from the door 12. The support arm 20 has a base 22 attached in a conventional manner to the sheet metal of the door 12. A control panel 24 mounted at the upper interior portion of the door 12 includes an on-off switch 26 for controlling the day/night viewing characteristics of the mirror unit 16 and a remotely controlled actuator 28 for controlling the orientation of the mirror unit 16 with respect to the driver of the vehicle.

The mirror housing 18 is formed by a suitable process such as die casting and, as shown in FIG. 2, includes a rear wall 30 and a projecting peripheral rim 32 defining a mirror cavity 34 opening toward the driver of the vehicle. An adjustment bracket 36 is fixedly secured to the rear wall 30 by a fastener 38. The bracket 36 includes a central support post 40 having a spherical tip 42. The bracket 36 is provided with guide openings 44 for receiving remotely controlled cables 46. The cables 46 include flexible sheaths 48 fixedly received in the openings 44 and cables 50 slidably received in the sheaths 48.

The mirror unit 16 is generally rectangular and comprises a front mirror element 52 and a rear mirror element 54 parallelly spaced to define a thin cavity in which a meltable thermoplastic medium 56 is contained. The elements 52 and 54 and the medium 56 are secured in fixed sealed relationship by a peripheral gasket 57. A mirror case 58 includes a front rectangular lip 59 crimped over the gasket 57 to retain the mirror unit 16 and a rear rectangular base portion 60 having a rear wall 62 spaced from the mirror element 54 to define a heating cavity 64. The rear wall 62 of the case 58 includes a center spherical socket 66 which universally engages the spherical tip 42 of the post 40 to accommodate universal adjustment of the mirror unit 16 thereabout. The control cables 50 are fixedly attached as at 68 to spaced locations on the rear wall 62. In a conventional manner, the cables 46 are connected to the actuator 28 such that selective adjustment of the latter will selectively extend or retract the various cables with respect to the sheaths to provide the desired positioning of the mirror unit 16. The remotely controlled feature constitutes no part of the present invention and other mounting arrangements such as a manually adjustable ball and socket connection are likewise contemplated for providing the desired orientation of the mirror unit 16.

A pair of vertically spaced horizontally disposed bulb heating elements 70 are carried by terminals 72 fixed to the sidewalls 73 of the mirror case 58. As shown in FIG. 3, the bulb heating elements 70 each comprise a cylindrical envelope having a coiled filament 74 axially positioned therein and electrically connected to conductive end caps 76. Each terminal 72 includes a pair of flexible arms 78 which frictionally grip the end caps 76 to support the heating elements 70. Each terminal 72 is connected to a lead 80. One lead of each terminal 72 is connected to ground at the housing 18. The other leads are commonly joined and electrically connected in series as shown in FIG. 2 with the switch 26 of the control panel 24, an electrical source such as the vehicle battery 84, and ground 86.

The heating element is a conventional double ended lamp bulb used for many motor vehicle lighting applications. In the present invention, the bulb has a wattage sufficient to rapidly melt the termoplastic medium 56 as hereinafter described. Alternatively the medium could be melted by a heating coil positioned in the medium or by resistance heating the reflective coating on element 54.

The mirror unit 16 as shown in detail in FIG. 4 comprises the clear glass element 52 and the rear glass element 54 which has a reflective coating 90 on its front surface. The surface 90 is in contact with the thermoplastic medium 56.

The thermoplastic medium has a low melting temperature of around 120° F. In the melted state, the medium is substantially clear and has a high transmissivity to light. In the solid state, the medium is translucent and has a lower transmissivity. A suitable material for such a medium would be a thermoplastic material manufactured by Essex Chemical Company, Newark, N.J. and available as formulation A-205-12-52E.

In other words, when the medium is melted as in the normal "day" driving modes the transmissivity is highest and the mirror unit possesses maximum reflectivity to provide a high reflective efficiency. When it is desired to provide an anti-glare or "night" driving mode reflectivity, the switch 26 is opened. After a lapse of time dependent on ambient conditions, the medium solidifies thereby decreasing the transmissivity of the medium by increasingly absorbing light. This has the effect of decreasing the reflectance of the observed reflecting surface. The heating elements 70 are designed to provide sufficient heat to liquify the medium 56 under the expected environmental operating conditions of the motor vehicle and as such the unit can operate substantially independent of environmental conditions. Additionally, it is anticipated that the nighttime driving mode would be continuously used and upon gradual solidification of the medium, the minimum reflectivity mode would be steadily in use. However, the response time of the medium should be fast enough that the mirror can be switched between the various reflective modes to compensate for changing environmental conditions.

Although only one form of this invention has been shown and described, other forms will be readily apparent to those skilled in the art. Therefore it is not intended to limit the scope of this invention by the embodiment selected for the purpose of this disclosure, but only by the claims which follow.

What is claimed is:

1. An anti-glare rear view mirror for a motor vehicle comprising: a mirror unit adapted to be adjustably connected to the motor vehicle, said mirror unit including a front transparent element and a rear reflective element spaced apart and defining a sealed cavity therebetween, a meltable medium in said cavity changeable between liquid and solid states upon heating thereof, said medium in one of said states having a high optical transmissivity so as to provide maximum reflectivity for the unit, said medium in the other of said states having a lower optical transmissivity to provide minimum reflectivity for the unit; and heating means in thermal exchange relationship with said medium operable for heating the latter to change said medium between states to provide the desired reflectivity.

2. An anti-glare rear view mirror for a motor vehicle for providing the driver of the vehicle with a variable reflectivity rearward field of view comprising: a housing adapted to be supported on the vehicle; a mirror unit adjustably connected to the housing means including first and second mirror elements, said first element being transparent and facing said driver, said second element having a reflective coating and spaced from the driver by said first element; a thermoplastic medium in said cavity changeable between a solid state and a liquid state by heating and cooling thereof, said medium in said liquid state having a high optical transmissivity, said medium in the solid state having a lower optical transmissivity; and heating means in thermal exchange with said medium; and control means for said heating means to energize said heating means for heating said medium to change said medium to the high optical transmissivity liquid state thereby providing maximum reflectivity for the unit, said heating means when deenergized permitting cooling of the medium to the lower optical transmissivity solid state thereby providing minimum reflectivity for the unit.

3. An exterior anti-glare rear mirror for a motor vehicle for providing the driver of the vehicle with a variable reflectivity rearward field of view comprising: a housing adapted to be supported on the exterior of the vehicle and having a mirror cavity opening toward the driver; a mirror unit located in the mirror cavity and adjustable connected to the housing, said mirror unit including a pair of glass elements; gasket means relatively spacing the elements to define a sealed cavity therebetween, one of said elements being transparent and facing said driver, the other of said elements having a reflective coating on the surface adjacent said one element and spaced from said driver by the latter; a meltable thermoplastic medium in said sealed cavity contacting said coating, said medium being changeable between a transluscent solid state and a transparent liquid state upon heating and cooling thereof; a heating element carried by the mirror unit in thermal exchange with said medium operable to change said medium between states to provide the desired reflectivity for the unit; and control means operable by the driver to energize the heating element to heat and melt the medium to said transparent liquid state for providing maximum reflectivity for the unit and to deenergize the heating element to cool and solidify the medium to said transluscent solid state for providing minimum reflectivity for the unit.

* * * * *